Figure 1:
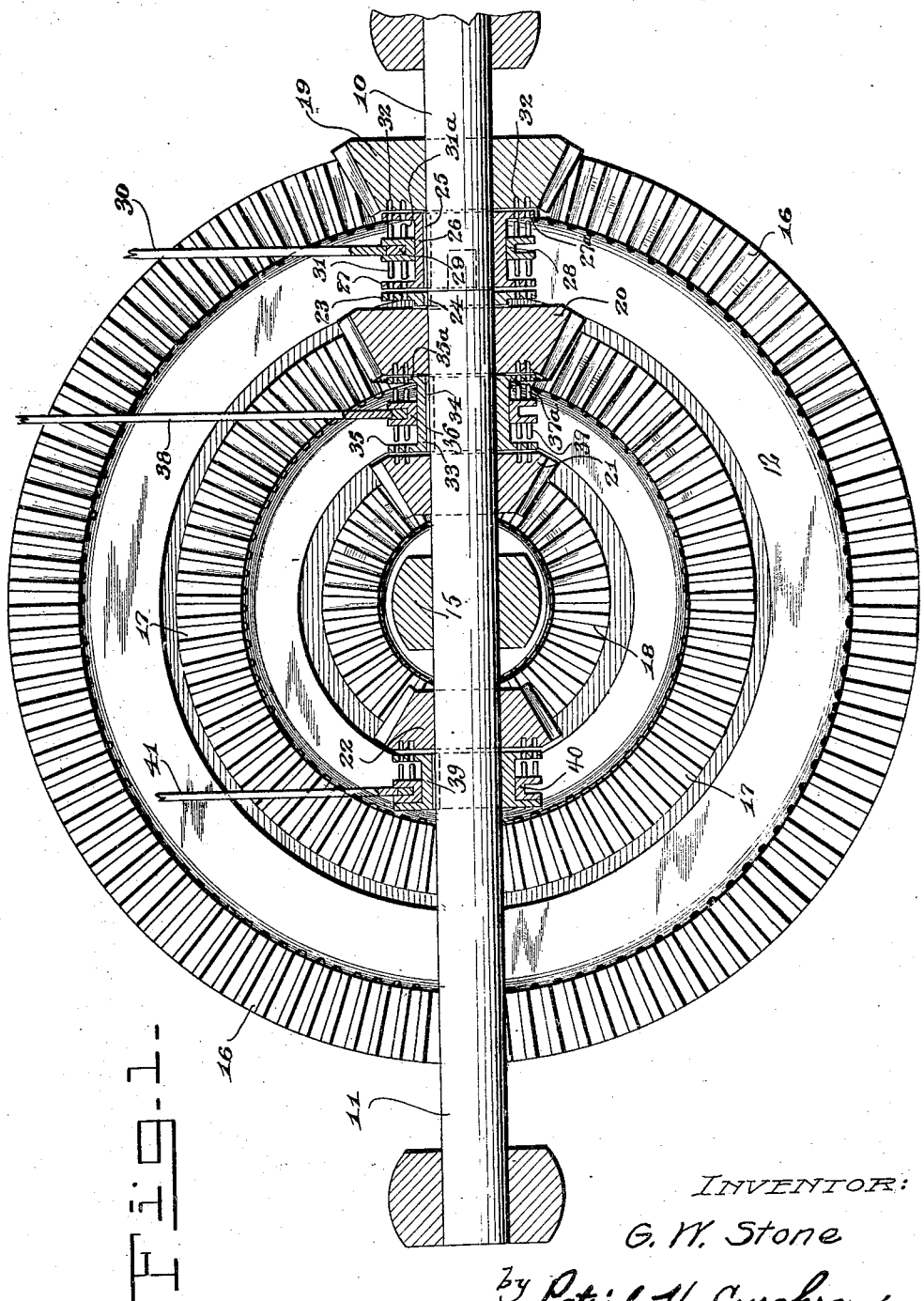

G. W. STONE.
TRANSMISSION GEARING.
APPLICATION FILED JULY 14, 1920.

1,418,338.

Patented June 6, 1922.
2 SHEETS—SHEET 1.

INVENTOR:
G. W. Stone
by Patrick H. Loughran
ATTORNEY.

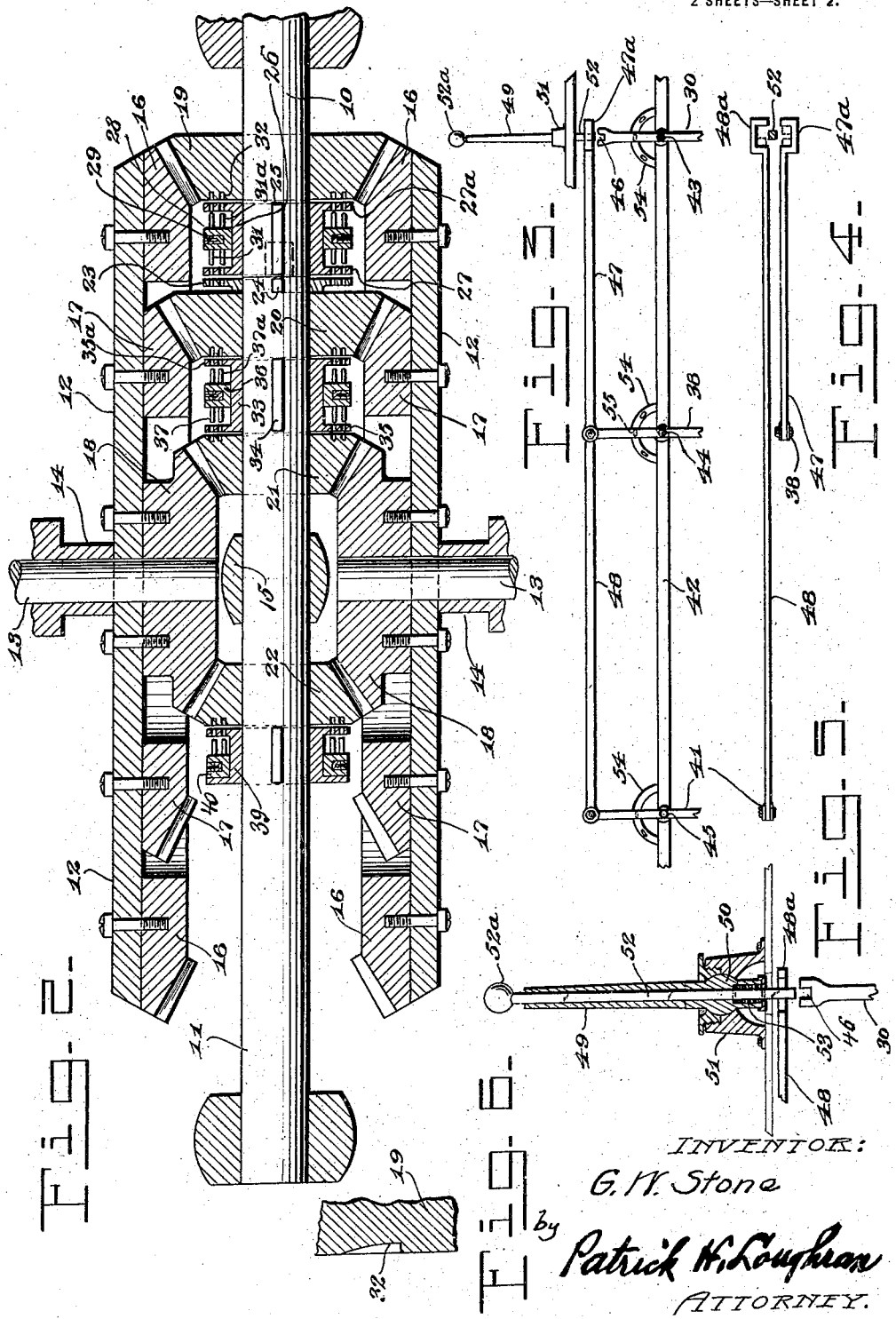

UNITED STATES PATENT OFFICE.

GEORGE W. STONE, OF GILLETTE, WYOMING.

TRANSMISSION GEARING.

1,418,338. Specification of Letters Patent. Patented June 6, 1922.

Application filed July 14, 1920. Serial No. 396,106.

*To all whom it may concern:*

Be it known that I, GEORGE W. STONE, a citizen of the United States, residing at Gillette, in the county of Campbell and State of Wyoming, have invented certain new and useful Improvements in Transmission Gearing, of which the following is a specification.

This invention relates to gearing for transmitting motion from a drive to a driven shaft at variable speeds and in different directions.

The invention has for its object to provide a novel and improved transmission gearing in which the several gear members are constantly in mesh, a driving connection being obtained by clutch devices.

The invention also has for its object to provide a mechanism of the kind stated which is simple in construction, and highly efficient in operation.

The objects stated are attained by means of a novel combination and arrangement of parts to be hereinafter described and claimed, and in order that the same may be better understood, reference is had to the accompanying drawings forming a part of this specification.

The preferred embodiment of the invention has been shown, but it will be understood that various changes and modifications may be made without a departure from the spirit and scope of the invention as claimed hereinafter.

In the drawings—

Figure 1 is a central longitudinal section of the mechanism; Fig. 2 is a horizontal section thereof; Fig. 3 is an elevation of a control means; Fig. 4 is a plan view of such means; Fig. 5 is a vertical section of a hand-lever, and Fig. 6 is a sectional view of a fragment of a pinion showing the arrangement of an aperture therein.

Referring specifically to the drawings, 10 denotes a drive shaft, and in axial alinement therewith is a driven shaft 11. As the mechanism which transmits the motion of shaft 10 to shaft 11 is designed more particularly for motor vehicles, the shaft 10 is connected to the motor crank shaft, and the shaft 11 is connected to the hind wheels which propel the car. It will be understood however, that the transmission mechanism is not limited in its application to motor vehicles, but may be used wherever motion is to be transmitted at different speeds and in different directions. This mechanism will now be described.

On an axis extending perpendicularly with respect to the axis of shaft 11 are two idle ring gear members 12, the same facing each other and each being loosely mounted on a shaft 13 supported in a bearing 14. The forward end of shaft 11 is shown supported in a bearing 15. These bearings are arranged in any suitable manner which is immaterial to the invention and hence need not be described.

Each ring gear member 12 has a plurality of bevel gear rings of different diameters denoted by the reference characters 16, 17 and 18, the same being separate and bolted or otherwise fastened to the members 12; or they may be made integral therewith.

On the drive shaft 10 is a loose bevel pinion 19 which seats between and is in mesh with the gears 16. On the shaft 11 are loose pinions 20, 21 and 22. The pinion 20 is in mesh with gears 17, and the pinions 21 and 22 are in mesh with the gears 18. It will be noted that pinions 21 and 22 engage gears 18 on diametrically opposite sides of their axes, so that the shaft 11 receives motion from gears 18 through pinion 21 in one direction, and in the opposite direction through pinion 22.

The forward end of shaft 11, where it abuts against shaft 10, is fitted with a clutch member consisting of an apertured disk 23 having its hub keyed or otherwise fastened to shaft 11, as shown at 24. On the adjacent end of shaft 10, is keyed or otherwise fastened, as shown at 25 a sleeve 26 having radially outstanding, and apertured flanges 27 and 27$^a$, respectively, at its ends. On this sleeve is slidably mounted a collar 28 which has a circumferential groove to loosely seat a shifter shoe 29 carried by a lever 30. From one side of the collar 28 extend pins 31, and from the opposite side extend pins 31$^a$. In the body of the pinion 19 are apertures 32.

The collar 28 is adapted to be shifted alternately in opposite directions, and when it is shifted to the left, its pins 30 pass through the apertures in the flange 27 and enter the apertures in the disk 23, so that the shafts 10 and 11 are now directly connected, and the direct, high speed drive is obtained. When the collar 28 is shifted to the right, the pins 31ª pass through the apertures in flange 27ª and enter the apertures 32 in pinion 19, so that the latter is now locked to the drive shaft 10, and the motion of said shaft is transmitted by said pinion to the ring gears 16, 17 and 18. These ring gears transmit motion to shaft 11 through pinions 20, 21 or 22, according to which one of said pinions is locked to said shaft. The pinions 20, 21 and 22 are normally loose on the shaft 11, and each is provided with a clutch whereby it may be locked to the shaft.

The clutch device for pinions 20 and 21 is located between the same, and it consists of a sleeve 33 keyed or otherwise fastened to shaft 11, as shown at 34, and having apertured end flanges 35 and 35ª like the sleeve 26. The pinions 20 and 21 are apertured like the pinion 19. On the sleeve 33 is slidably mounted a collar 36 having side pins 37 and 37ª respectively, and operated by a shifter lever 38.

To obtain the low speed drive, the collar 36 is shifted to the left to pass pins 37 through the apertures in flange 35 and into the apertures of the pinion 21, so that the latter is now locked to the shaft 11.

To obtain the intermediate speed, the pinion 20 is locked to shaft 11 by sliding the collar 36 to the right to pass the pins 37ª through the apertures in flange 35ª and into the apertures of said pinion.

A clutch device similar to the one hereinbefore described is provided for the reverse pinion 22, the sleeve fast on shaft 11 being shown at 39, the slidable pin-carrying collar at 40, and the shifter lever at 41.

It will be noted that to obtain the intermediate speed, the low speed, and the reverse, the collar 28 must also be shifted to lock the pinion 19 to the drive shaft 10. For the direct, high speed drive, the collar 28 is shifted as hereinbefore described to directly connect the shafts 10 and 11, and the clutch device for the pinions 20, 21 and 22 must be placed in neutral position to leave said pinions loose on shaft 11, the pinion 19 being also loose on shaft 10 as its release was effected when the collar 28 was shifted to lock the shafts 10 and 11 together.

The shifter lever 30 is pivoted to a support 42 as shown at 43. To this support the shifter lever 38 is pivoted at 44, and the shifter lever 41 at 45. The upper end of lever 30 has a notch or socket 46. To the upper end of lever 38 is connected a link 47, and to lever 41 is connected a link 48.

The links 47 and 48 are parallel, and their forward ends are bent to form slots 47ª and 48ª, respectively.

At 49 is shown a hand lever having a ball 50 seating in the socket of a support 51 to provide the usual ball-and-socket connection to enable the hand lever to be swung in all directions. Extending lengthwise through hand lever 49 is a rod 52 having its upper end projecting from the corresponding end of the hand lever and provided with a knob handle 52ª. The rod 52 is slidable up and down in the hand lever 49 so that it may project more or less from the bottom of the latter, a spring 53 being provided for normally holding the rod elevated or retracted. The slots 47ª and 48ª are on opposite sides of the lower projecting end of rod 52.

When the hand lever 49 is in erect position, the lower end of rod 52 is in line with the notch 46, and hence upon pressing the rod 52 down it enters said notch and couples the hand lever to the shifter lever 30. The hand lever may now be swung forwardly or rearwardly to shift the collar 28 for the purpose hereinbefore described. Upon swinging the hand lever 49 sidewise to engage the lower end of rod 52 with the slot 47ª, and swinging the hand lever forwardly or rearwardly, as shown dotted in Fig. 4, the link 47 operates the shifter lever 38 to obtain the low or intermediate speed. The reverse drive is obtained by swinging the hand lever 49 over to seat the rod 52 in slot 48ª, and then swinging the hand lever rearwardly as shown dotted in Fig. 4 so that it may now operate the shifter lever 41 through the link 48.

The shifter levers 30, 38 and 41, are provided with suitable latch devices for holding them in the positions to which they may be swung. Each of these devices is a notch in sector 54 on the support 42, and a flat spring 55 on the lever adapted to enter the notch or notches. The spring is arranged so that it yields and slips out of the notch when the shifter lever is swung by the hand lever 49 as hereinbefore described.

The apertures in the pinions 19, 20, 21 and 22 are elongated and they gradually increase in depth in the direction of rotation to assure the proper entry of the locking pins of the clutch device. This arrangement is illustrated in Fig. 6.

I claim—

The combination of axially alined drive and driven shafts, a pair of idling ring gear members having each a plurality of gears of different diameters, bevel pinions in mesh with the ring gears, one of said pinions being loose on the drive shaft, and a pair of said pinions being loose on the driven shaft, a reversing bevel pinion loose on the driven shaft and in mesh with one of the ring gears, a clutch element fast on the driven shaft, a clutch member carried by the drive shaft and driven thereby, said clutch member being adjustable to obtain a direct driving connection between the drive shaft and the aforesaid clutch element, and to establish a driving connection between the drive shaft and the aforesaid pinion which is loose on said shaft, a clutch member between the aforesaid pair of pinions, and adjustable for selectively establishing a driving connection between said pinions and the driven shaft, and a clutch member adjustable for establishing a driving connection between the reversing pinion and the driven shaft.

In testimony whereof I affix my signature.

GEORGE W. STONE.